(12) United States Patent
Kono et al.

(10) Patent No.: US 7,633,957 B2
(45) Date of Patent: Dec. 15, 2009

(54) RELAY DEVICE, PACKET FILTERING METHOD, AND PACKET FILTERING PROGRAM

(75) Inventors: Kenji Kono, Funabashi (JP); Takahiro Shinagawa, Machida (JP); Md. Rahat Kabir, Tokyo (JP)

(73) Assignee: Japan Science and Technology Agency, Saltama (JP)

( * ) Notice: Subject to any disclaimer, the term of this patent is extended or adjusted under 35 U.S.C. 154(b) by 383 days.

(21) Appl. No.: 11/569,743

(22) PCT Filed: May 26, 2005

(86) PCT No.: PCT/JP2005/009632

§ 371 (c)(1),
(2), (4) Date: Nov. 28, 2006

(87) PCT Pub. No.: WO2005/117374

PCT Pub. Date: Dec. 8, 2005

(65) Prior Publication Data

US 2007/0242681 A1    Oct. 18, 2007

(30) Foreign Application Priority Data

May 31, 2004    (JP) ............................. 2004-162129

(51) Int. Cl.
    H04L 12/28    (2006.01)
(52) U.S. Cl. .................. 370/401; 370/402; 370/404
(58) Field of Classification Search .................. 370/389, 370/401, 386, 392, 254
    See application file for complete search history.

(56) References Cited

U.S. PATENT DOCUMENTS 5,758,083 A * 5/1998 Singh et al. .................. 709/223

(Continued)

FOREIGN PATENT DOCUMENTS

EP    1006701    6/2000

(Continued)

OTHER PUBLICATIONS

International Preliminary Report on Patentability for International Application No. PCT/JP2005/009632 dated Dec. 14, 2006.

(Continued)

*Primary Examiner*—Dang T Ton
*Assistant Examiner*—Nourali Mansoury
(74) *Attorney, Agent, or Firm*—Patterson & Sheridan, L.L.P.

(57) ABSTRACT

A relay device 10 is a relay device for relaying a communication message on a packet-by-packet basis, which comprises an order determiner 13 for determining whether a packet received is one received in an order to be received, a packet holder 14 for, when it is determined that the packet is not one received in the order to be received, holding the packet, and for performing such a control as to relay the packet, a merger 15 for merging a payload of the received packet with a payload of the held packet, a verifier 16 for verifying whether a payload of a packet satisfies a predetermined rule, and a relay controller 17 for, when a packet satisfies the rule, performing such a control as to execute relay of the packet. This prevents an increase of a communication delay and enables detection of an irregular communication message in an application layer protocol, irrespective of types of protocols.

4 Claims, 5 Drawing Sheets

U.S. PATENT DOCUMENTS

| | | |
|---|---|---|
| 2003/0051165 A1 | 3/2003 | Krishnan et al. |
| 2003/0123447 A1 | 7/2003 | Smith |
| 2003/0221010 A1* | 11/2003 | Yoneya et al. ............... 709/227 |
| 2004/0170173 A1* | 9/2004 | Pan et al. .................... 370/392 |

FOREIGN PATENT DOCUMENTS

| | | |
|---|---|---|
| EP | 1 335 559 | 8/2003 |
| JP | 2003 099339 | 4/2003 |
| JP | 2004 062417 | 2/2004 |
| JP | 2000 174808 | 6/2006 |
| TW | 453070 | 9/2001 |
| TW | 484282 | 4/2002 |
| TW | 550903 | 9/2003 |
| TW | 567468 | 12/2003 |
| WO | WO 02/19639 | 3/2002 |

OTHER PUBLICATIONS

Ito, et al., "Illustrated & Standard Current VPN Handbook," pp. 56-61, Shuwa System Co., Ltd., May 2003.
International Search Report for Application No. PCT/JP2005/009632, dated Aug. 18, 2005.
EP Search Report, Application No. EP 05743800, dated Jan. 22, 2008.
Taiwan Office Action, Patent Application No. 094117569, dated Jun. 4, 2009.
Japanese Office Action for Japanese Patent Application No. P2004-162129 dated Jul. 7, 2009 (with English Translation).
Computer & Network LAN, vol. 18, No. 9, Sep. 2000, pp. 9-17.
N+I Network Guide, vol. 3, No. 7, pp. 244-247.

* cited by examiner

> regexpr echo_message : [a-zA-Z]+;

(b)

> state receive : INITIAL{
>     <: echo_message' \r\n' -> reply;
> }

(c)

> state reply {
>     :> echo_message' \r\n' ->TERMINAL;
> }

(d)

> state S{
>     <: echo_message[<=4096]->T;
> }

RELAY DEVICE, PACKET FILTERING METHOD, AND PACKET FILTERING PROGRAM

TECHNICAL FIELD

The present invention relates to a relay device for relaying a communication message on a packet-by-packet basis, a packet filtering method in the relay device, and a packet filtering program.

BACKGROUND ART

A variety of techniques have been proposed heretofore to filter data transmitted and received on a network, in order to prevent attacks from the outside in communication systems such as the Internet. Examples of the attacks from the outside include a buffer overflow attack, a format string attack, and so on, and many of these types of attacks are attacks using a communication message violating a communication rule defined in a protocol of an application layer (e.g., HTTP (HyperText Transfer Protocol) or SMTP (Simple Mail Transfer Protocol)) of the OSI (Open Systems Interconnection) reference model.

Since the message violating the protocol of the application layer contains a factor of an irregularity inside the contents of data, i.e., a payload of a packet (the main body of data originally desired to be transferred, except for information of the header in the packet), it is not detected by packet filtering for detecting irregular data with reference to the header information of the packet. In order to detect the irregular message in the application layer protocol, it is necessary to reference the contents of the data, and there is an application gateway for detecting the irregular message in this manner (e.g., reference is made to Non-patent Document 1 below).

Non-patent Document 1: Yukio Ito, Masayoshi Shido, and Osamu Noguchi "Illustrated & Standard Current VPN Handbook," pp 56-61, Shuwa System Co., Ltd., May 2003

DISCLOSURE OF THE INVENTION

Problems to be Solved by the Invention

The application gateway is a sort of proxy interposed between a server and a client, and monitors data transmitted and received, as a message stream. Namely, the application gateway reconfigures a communication message from data flowing in the form of packets on the network, and analyzes the reconfigured communication message to detect an irregularity. Therefore, the application gateway does not relay the packets before the communication message is determined not to be irregular. Therefore, the flow of packets on the network is interrupted to cause a communication delay. Since the application gateway performs the foregoing detection of the irregular communication message in each protocol, it is necessary to prepare application gateways as many as the number of protocols.

The present invention has been accomplished in order to solve the above problem and an object of the present invention is to provide a relay device, a packet filtering method, and a packet filtering program capable of detecting an irregular communication message in an application-layer protocol, irrespective of types of protocols, while preventing an increase of communication delay.

Means for Solving the Problems

In order to achieve the above object, a relay device according to the present invention is a relay device for relaying a communication message on a packet-by-packet basis, comprising: order determining means for determining whether a packet received is one received in an order to be received; packet holding means for, when the order determining means determines that said packet is not one received in the order to be received, holding said packet, and for performing such a control as to relay the packet; merging means for determining whether the packet held by the packet holding means is one to be verified in conjunction with a packet received after the packet held, based on the order to be received, and for merging a payload of said received packet with a payload of the held packet on the basis of the determination; verifying means for, when the order determining means determines that the packet is received in the order to be received, verifying whether a payload of the packet or a payload of the packets merged by the merging means satisfies a predetermined rule, and for holding information about a verification content thereof in order to use the information in a next verification in the communication message; and relay controlling means for, when the verifying means verifies that the packet satisfies the rule, performing such a control as to execute relay of the packet and for, when the verifying means determines that the packet does not satisfy the rule, performing such a control as to prohibit the relay of the packet.

Since the above-described relay device is arranged to perform the verification of the irregularity for the payload upon every reception of a packet and then to transmit the packet, it is able to prevent an increase of the communication delay in the detection of the irregular communication message in the application layer protocol. Since the rule used in the verification of the irregularity can be set independently of the type of the application layer protocol, the irregular communication message can be detected irrespective of types of protocols.

Preferably, the verifying operation by the verifying means and the holding operation of the information about the verification content are carried out by means of an automaton, as an example. When the automaton is used, the aforementioned rule for performing the verification and the holding operation of the verification content can be declaratively described, which facilitates the creation of the rule, verification, and maintenance.

Here, the present invention can also be described as the invention of the packet filtering method and the packet filtering program as described below, in addition to the description as the invention of the relay device described above. It is noted that these are different just in category but are substantially the same invention, with similar action and effect.

A packet filtering method according to the present invention is a packet filtering method in a relay device for relaying a communication message on a packet-by-packet basis, the method comprising: an order determining step of determining whether a packet received is one received in an order to be received; a packet holding step of, when it is determined in the order determining step that said packet is not one received in the order to be received, holding said packet, and of performing such a control as to relay the packet; a merging step of determining whether the packet held in the packet holding step is one to be verified in conjunction with a packet received after the packet held, based on the order to be received, and of merging a payload of the received packet with a payload of the held packet on the basis of the determination; a verifying step of, when it is determined in the order determining step that the packet is received in the order to be received, verifying whether a payload of said packet or a payload of the packets merged in the merging step satisfies a predetermined rule, and of holding information about a verification content thereof in order to use the information in a next verification in the communication message; and a relay controlling step of, when it is verified in the verifying step that the packet satisfies the rule, performing such a control as to execute relay of the packet and of, when it is determined in the verifying step that the packet does not satisfy the rule, performing such a control as to prohibit the relay of the packet. Preferably, the verifying operation in the verifying step and the holding operation of the information about the verification content are carried out by means of an automaton, as an example.

A packet filtering program according to the present invention is a packet filtering program for letting a relay device for relaying a communication message on a packet-by-packet basis, execute the following processes: an order determining process of determining whether a packet received is one received in an order to be received; a packet holding process of, when it is determined by the order determining process that said packet is not one received in the order to be received, holding said packet, and of performing such a control as to relay the packet; a merging process of determining whether the packet held by the packet holding process is one to be verified in conjunction with a packet received after the packet held, based on the order to be received, and of merging a payload of the received packet with a payload of the held packet on the basis of the determination; a verifying process of, when it is determined by the order determining process that the packet is received in the order to be received, verifying whether a payload of said packet or a payload of the packets merged by the merging process satisfies a predetermined rule, and of holding information about a verification content thereof in order to use the information in a next verification in the communication message; and a relay controlling process of, when it is verified by the verifying process that the packet satisfies the rule, performing such a control as to execute relay of the packet and of, when it is determined by the verifying process that the packet does not satisfy the rule, performing such a control as to prohibit the relay of the packet. Preferably, the verifying operation by the verifying process and the holding operation of the information about the verification content are carried out by means of an automaton, as an example.

EFFECTS OF THE INVENTION

According to the present invention, as described above, the verification of the irregularity on the payload is carried out upon every reception of a packet and the packet is then transmitted; therefore, an increase of the communication delay is prevented in the detection of the irregular communication message in the application layer protocol. Since the rule used in the verification of the irregularity can be set independently of the type of the application layer protocol, the detection of the irregular communication message can be performed regardless of types of protocols.

DESCRIPTION OF THE SYMBOLS

10—relay device, 11—receiver, 12—transmitter, 13—order determiner, 14—packet holder, 15—merger, 16—verifier, 17—relay controller, 20—source, 30—destination, 40—recording medium, 40a—program storage area, 41—packet filtering program, 41a—order determining module, 41b—packet holding module, 41c—merging module, 41d—verifying module, 41e—relay controlling module.

BEST MODES FOR CARRYING OUT THE INVENTION

Preferred embodiments of the present invention will be described below in detail with reference to the drawings. In the description of the drawings identical or equivalent portions will be denoted by the same reference symbols, without redundant description.

Figure 1:
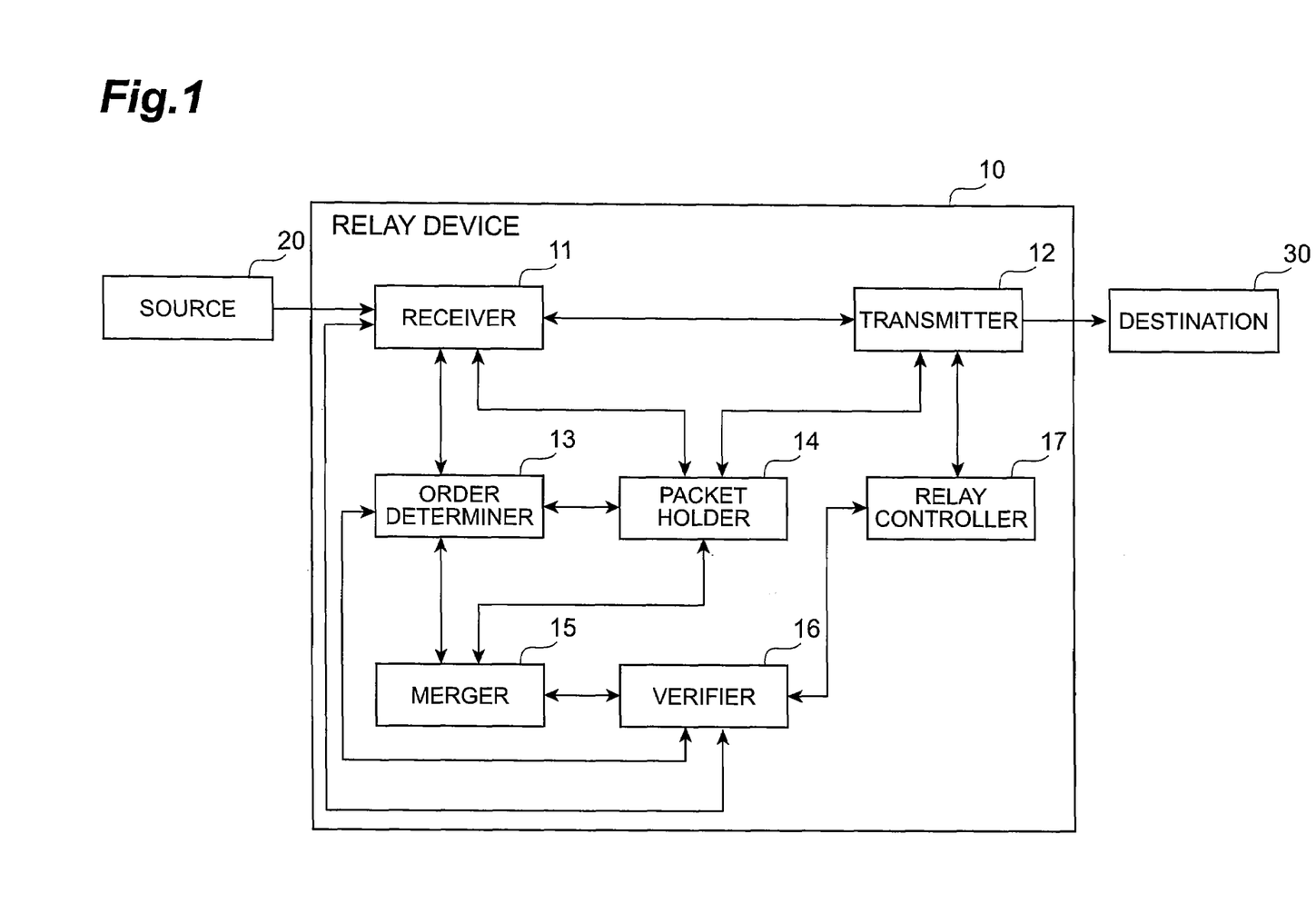
FIG. 1 is an illustration showing a configuration of a relay device according to an embodiment.

FIG. 1 shows a configuration of relay device 10 according to the present embodiment. The relay device 10 routes packets transmitted from source 20, to destination 30, thereby performing relay of packets. The relay device 10 is specifically composed of a CPU, a memory, etc. and is preferably implemented, for example, by information processing device such as a router or bridge. The source 20 corresponds, for example, to a server device for transmitting data, or to another relay device. The destination 30 corresponds, for example, to a client device as a recipient of data.

A packet herein refers to data obtained in the following manner: data as a communication message is divided into small segments to be transmitted and received through a network 50 (see FIG. 2) and each segment is provided with control information including an address of a destination and others. A sequence of packets are received by the destination of data to be recombined into the original data. The size of packets is determined depending upon the size of data that can be transmitted in the data link layer.

The present embodiment mainly adopts an example based on TCP (Transmission Control Protocol) for transmission of packets. Each packet is provided with a header storing the aforementioned control information, on the occasion of the division of data of the communication message. This header contains a sequence number being information of an order for reconfiguring (or restoring) correct data from packets, and others. The reconfiguration of data is carried out by connecting payloads of packets in order from the smallest sequence number. It is noted that a sequence of packets transmitted are not always received in the order of sequence numbers by the destination of data. This is, for example, because the packets are relayed via different routes on the network 50. The sequence numbers are determined as follows on the basis of the size of payloads. For example, supposing the sequence number of the first packet is 2001 and the size of payloads is 1000 bytes, the sequence number of the next packet is 3001 and the sequence number of the third packet is 4001.

Figure 2:
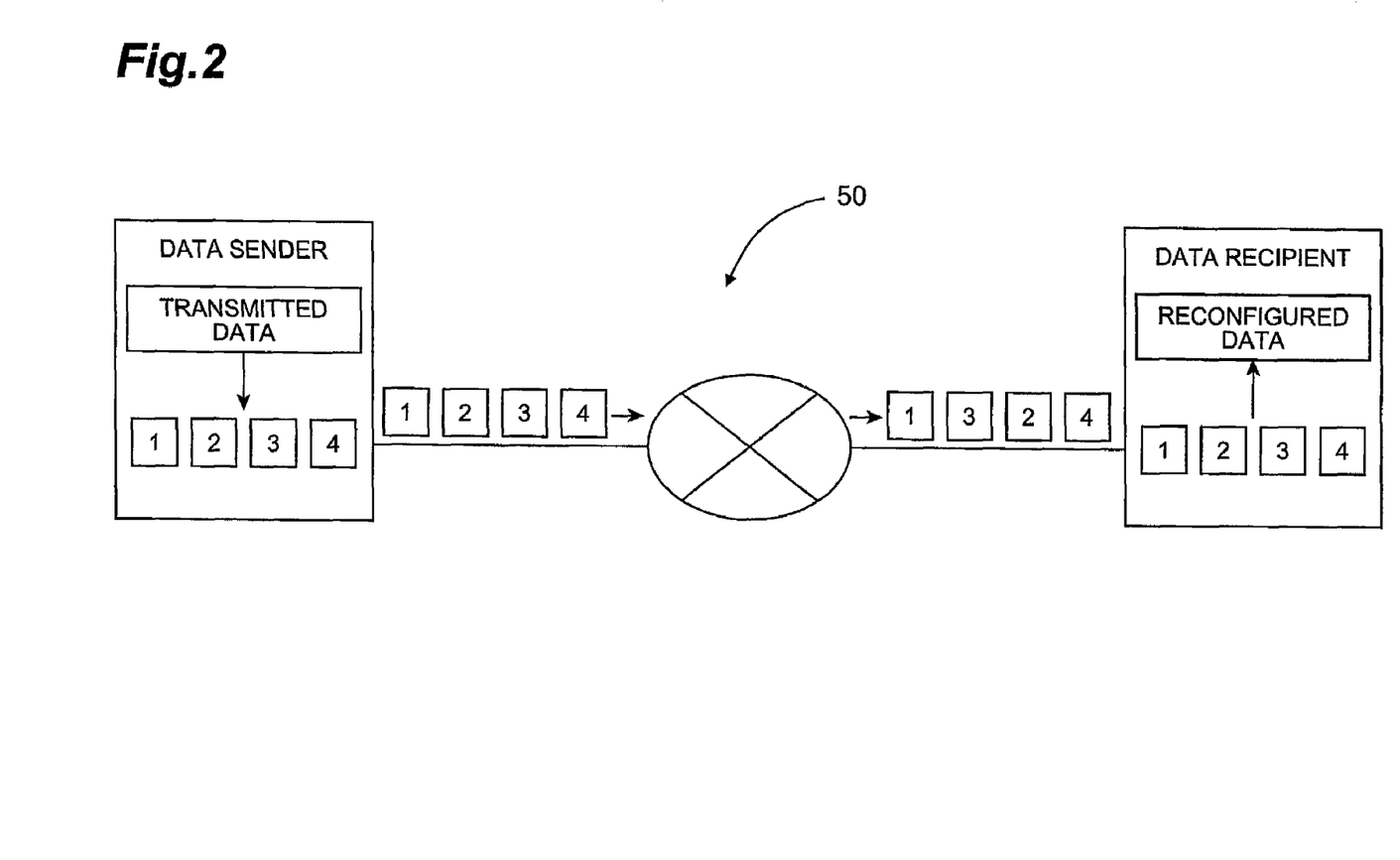
FIG. 2 is an illustration showing an example of orders of transmission and reception of packets.

FIG. 2 shows a simple example of division and reconfiguration of packets. As shown in FIG. 2, let us suppose a case where the data sender divides data to be transmitted and adds information of an order of "1," "2," "3," and "4" for reconfiguration to the header of each packet, and then transmits the packets in the order. The data recipient does not always receive the packets in the order of "1," "2," "3," and "4," but it can receive the packets in another order of "1," "3," "2," and "4" as shown in FIG. 2. Even in this case, the recipient can reconfigure the data with reference to the information of the order contained in the headers of the packets.

Subsequently, each of functions of the relay device 10 will be described. As shown in FIG. 1, the relay device 10 comprises a receiver 11, a transmitter 12, an order determiner 13 (order determining means), a packet holder 14 (packet holding means), a merger 15 (merging means), a verifier 16 (verifying means), and a relay controller 17 (relay controlling means). The relay device 10 is assumed to relay all packets associated with a communication message transmitted to the destination 30, like a proxy server.

The receiver 11 is a part that receives packets to be relayed, which have been transmitted from the source 20. The transmitter 12 is a part that transmits the packets to be relayed, received by the receiver 11, to the predetermined destination 30.

The order determiner 13 is a part that references a packet received by the receiver 11 and determines whether the packet is one received in an order to be received. Here the order to be received is preferably, for example, an order for reconfiguration of data, i.e., the order from the smallest sequence number. The determination on whether or not one received in the order to be received is preferably carried out, for example, with reference to the information of the header of the packet. The information about the determination result is transmitted to each of the packet holder 14, merger 15, and verifier 16.

The packet holder 14 is a part that, when the order determiner 13 determines that the packet received is not one received in the order to be received, holds this received packet (a copy of the packet). The packet holder 14 also controls the transmitter 12 to transmit this packet to the predetermined destination 30.

The merger 15 is a part that determines whether the packet held by the packet holder 14 is one to be verified in conjunction with a packet received by the receiver 11 after the packet held, and that merges a payload of the received packet with a payload of the held packet on the basis of the determination. The verification herein is that by the verifier 16. A specific determination method and others will be described later.

The verifier 16 is a part that, when the order determiner 13 determines that the packet received is one received in the order to be received, verifies whether the payload of the packet satisfies a predetermined rule. If the payload of the packet as an object to be verified is one of merged packets obtained by merging the payload of the received packet with the payload of the packet held by the packet holder 14, by the merger 15, the payload in question is that of the merged packets. The verifier 16 holds the information about the verification content, in order to use it in the next verification in the same communication message. When the information about the verification content held is used in the verification of the next packet in the same communication message, the same effect can be obtained as verification of the message stream. The reason is that the verification of only the received packet by the rule is insufficient for detection of an irregular communication message and that an irregular communication message can be detected by verifying the message stream composed of packets. It is also possible to hold all the received packets (copies of packets) in the same communication message, to reconfigure data up to a currently received packet from the held packets upon every reception, and to perform the verification on the data.

Specifically, the verification by the verifier 16 is preferably carried out as follows: the payload as an object to be verified is handled as data of a character string and it is determined whether this character string data satisfies a predetermined rule. Here the predetermined rule is preferably one to detect a communication message violating a communication rule defined in an application layer protocol. Such a rule is, for example, that the character string data matches a predetermined pattern, or does not match the predetermined pattern. Another rule is that any control code other than the character string is not contained. This arises from the fact that an irregular communication message often contains a control code, and thus the above rule is to detect it. If this rule contains one corresponding to a specific protocol, the detection of the irregular communication message in that protocol can be performed more accurately.

The relay controller 17 is a part that, when the verifier 16 determines that a packet satisfies the rule, controls the transmitter 12 so as to perform transmission of the packet, and that, when the verifier 16 determines that a packet does not satisfy the rule, controls the transmitter 12 so as to prohibit transmission of the packet.

Figure 3:
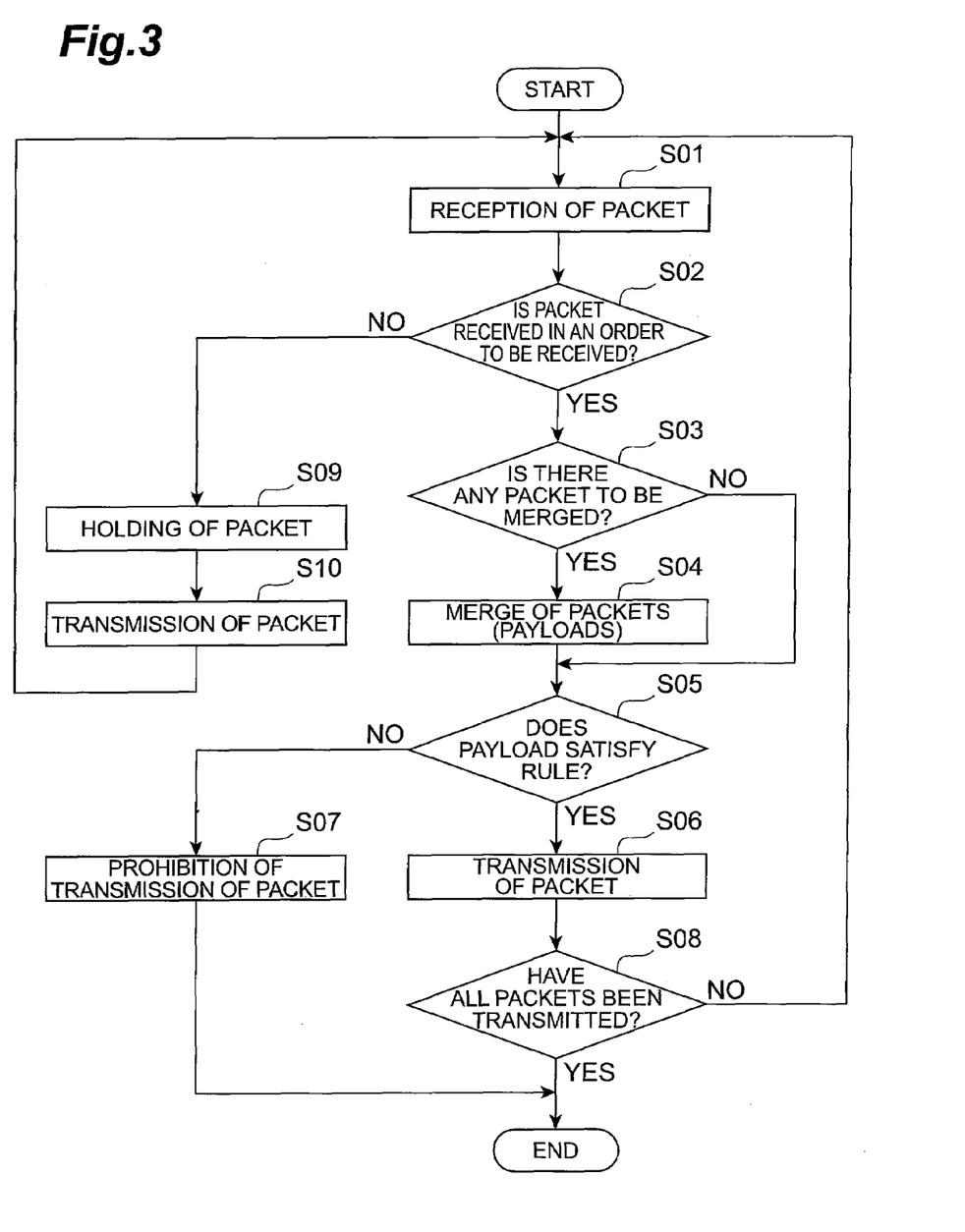
FIG. 3 is a flowchart showing a process executed by the relay device in the embodiment.

A process executed by the relay device 10 in the present embodiment will be described below using the flowchart of FIG. 3. This process is carried out when packets associated with a communication message, which is to be transmitted from source 20 to destination 30, are relayed by the relay device 10. In TCP, after a connection is established between source 20 and relay device 10, transmission of packets is carried out.

When a packet is transmitted, the receiver 11 in the relay device 10 receives the incoming packet (S01). The receiver 11 specifies on which connection the received packet is based, with reference to information to specify IP (Internet Protocol) addresses of source 20 and destination 30, port numbers of source 20 and destination 30, and the application layer protocol, contained in the header information of the packet, and holds it. Furthermore, the receiver 11 references the header information of the packet to specify to which communication message the packet belongs. The receiver 11 specifies the destination 30 (forwarding address), based on these information pieces and a routing table held by the relay device 10.

Subsequently, the order determiner 13 determines whether the received packet is one received in an order to be received (S02). This determination is carried out by reading out the received packet and referencing the sequence number contained in the header of the packet.

For example, when the packet is determined to be one received in the order to be received, like the packet of "1" in FIG. 2, the merger 15 then determines whether there is a packet to be merged with the received packet, among packets held by the packet holder 14 (S03). In the case of the packet of "1," it is the first received packet in the same communication message and thus there is no packet to be merged therewith. FIG. 2 shows the example wherein the relay is illustrated to reconfigure the data from packets, but the relay device 10 is normally configured not to perform the reconfiguration of data.

Subsequently, the verifier 16 verifies whether the payload of the received packet satisfies the rule (S05). When it is determined here that the packet satisfies the rule, i.e., when it is determined that the packet is not associated with an irregular communication message, the relay controller 17 controls the transmitter 12 to perform transmission of this packet to the destination 30. The transmitter 12 thus controlled performs the transmission of the packet (S06). The determination herein that the packet is not associated with an irregular communication message is one based on the information of packets having been received heretofore. Namely, there is a case where the packet is determined to be associated with an irregular communication message, based on information of a packet received after this determination. When the packet is determined to satisfy the rule, the verifier 16 holds the information about the verification content. When all the packets in the communication message have been transmitted at this point, the process is terminated (S08).

When the verification by the verifier 16 results in determining that the packet does not satisfy the rule, i.e., it is associated with an irregular communication message, the relay controller 17 performs such a control as to prohibit the transmitter 12 from transmitting this packet to the destination 30. The transmitter 12 thus controlled prohibits the transmission of the packet (S07). If the prohibition of transmission of a packet occurs, all the packets received thereafter are also prohibited from being transmitted, and the process is terminated. In the sequential packet verification process, when a packet is determined not to satisfy the rule on the way of transmission of packets, packets before it have already been transmitted to the destination 30. However, the destination 30 is normally configured not to raise data to the application layer before all the packets arrive; therefore, an attack or the like by an irregular communication message can be prevented.

When it is determined at S08 that all the packets have not been transmitted yet, the receiver 11 then performs reception of another packet (S01). Subsequently, the order determiner 13 determines whether the received packet is one received in the order to be received (S02). When it is determined here that the received packet is not one received in the order to be received, for example, like the packet of "3" in FIG. 2 (i.e., when the packet is one received before the packet of "2" to be received ahead of the packet of "3"), the packet holder 14 holds a copy of the packet (S09). Subsequently, the packet holder 14 controls the transmitter 12 to transmit the packet to the destination 30. The transmitter 12 thus controlled performs the transmission of the packet (S10). This process ends up with the result that the packet received earlier than in the order to be received is held by the packet holder 14.

Subsequently, the receiver 11 performs reception of still another packet (S01) and the order determiner 13 determines whether the received packet is one received in the order to be received (S02). When the verification has successfully been done up to the packet of "1" and when the received packet is determined to be one received in the order to be received, for example, like the packet of "2" in FIG. 2, the merger 15 then determines whether there is a packet to be merged with the received packet among packets held by the packet holder 14 (S03). For making this determination, the order determiner 13 reads out a packet held by the packet holder 14 and references the sequence number of the header of the packet. This determination is made by judging whether the held packet is to be verified in conjunction with the received packet, based on the order to be received. For example, where a packet with the sequence number subsequent to the received packet exists among the held packets, the packet held is determined to be verified in conjunction with the received packet, and it is determined that they are to be merged. For example, in the case of the example of FIG. 2, where the packet of "3" is held and where the packet of "2" is received, the packet of "3" is one subsequent to the packet of "2" and thus the packet of "3" held is determined to be merged with the packet of "2" received.

Then the merger 15 merges the payloads of those packets so as to enable the verification by the verifier 16 (S04). Then the verifier 16 verifies whether the payload of the merged packets satisfies the rule (S05). The verification herein is performed using the information about the verification content held by the verifier 16, if the verification of the packet associated with the same communication message is carried out before the verification herein. In the example in FIG. 2, where the verification is performed on the payload of the packets of "2" and "3," the verification is carried out with reference to the verification content of "1" carried out before it.

When the packet is determined to satisfy the rule, i.e., when the packet is determined not to be associated with an irregular communication message, the relay controller 17 controls the transmitter 12 to transmit this packet to the destination 30. The transmitter 12 thus controlled performs the transmission of the packet (S06). Since the packet held by the packet holder 14 has already been transmitted, the packet transmitted herein is preferably one not containing the held packet. When all the packets in the communication message have been transmitted at this point, the process is terminated (S08). When the packet is determined not to satisfy the rule, the process thereafter is carried out in the same manner as above.

Since the relay device 10 of the present embodiment is arranged to perform the verification of the irregularity on the payload upon every reception of a packet and then to transmit the packet, it is able to prevent an increase of the communication delay in the detection of the irregular communication message in the application layer protocol. Since the rule used in the verification of the irregularity can be set independently of the type of the application layer protocol, the irregular communication message can be detected irrespective of types of protocols.

The verification by the verifier 16 and the holding operation of information about the verification content are preferably carried out by means of an automaton. The verification by the automaton can be performed by a state transition based on the content of the payload of the packet. The holding operation of the verification content can be performed by associating a state in the automaton with the verification content and holding the state upon every execution of the verification by the verifier 16.

Figure 4:
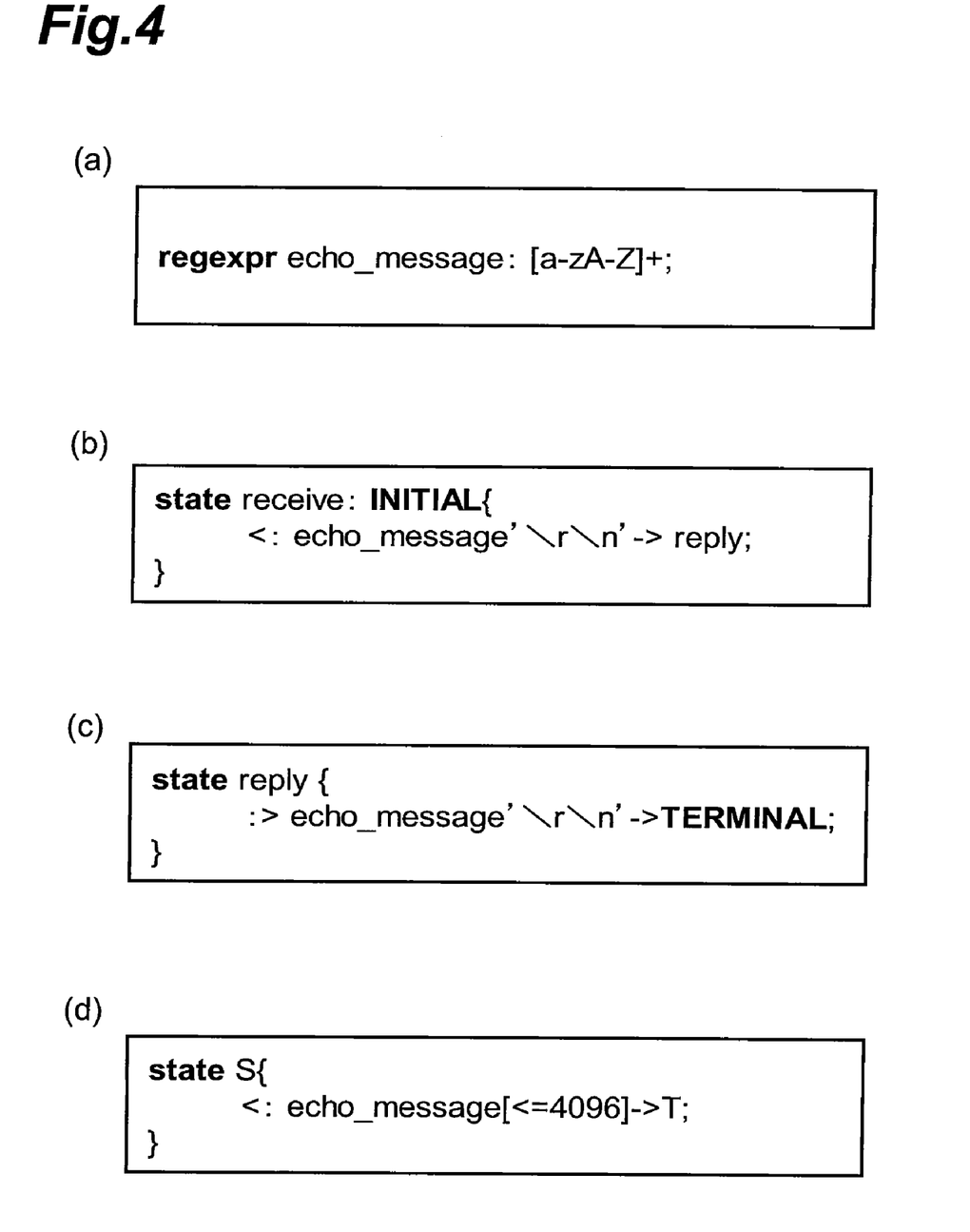
FIG. 4 is an illustration showing an example of a representation of an automaton.

An expression by the automaton is, for example, one as shown in FIG. 4. For example, first, a regular expression as shown in the example (a) of FIG. 4 is used to define an alphabet message as "echo_message." Furthermore, a state of "receive" is defined as an initial state (INITIAL) as shown in the example (b) of FIG. 4. The state "receive" defines in brackets a transition into a state "reply" if the content of the payload agrees with "echo_message." As shown in the example (c) of FIG. 4, the state "reply" is a state to transmit a received packet. Namely, the automaton shown in the examples (a)-(c) of FIG. 4, as described above, is able to determine that the payload of the packet is an alphabet character string. It can also determine the size of the message length, as shown in the example (d) of FIG. 4.

By using the automaton as described above, it is feasible to declaratively describe the aforementioned rule for performing the verification and the holding operation of the verification content and it becomes easier to perform the creation of the rule, the verification, and maintenance. It is also able to precisely describe exchange of communication messages in the application layer protocol.

If fragmentation, which is further division of divided packets, occurs, reference can be made to a flag or the like contained in fragmented data to determine the order of packets, and the aforementioned processing can be carried out.

Figure 5:
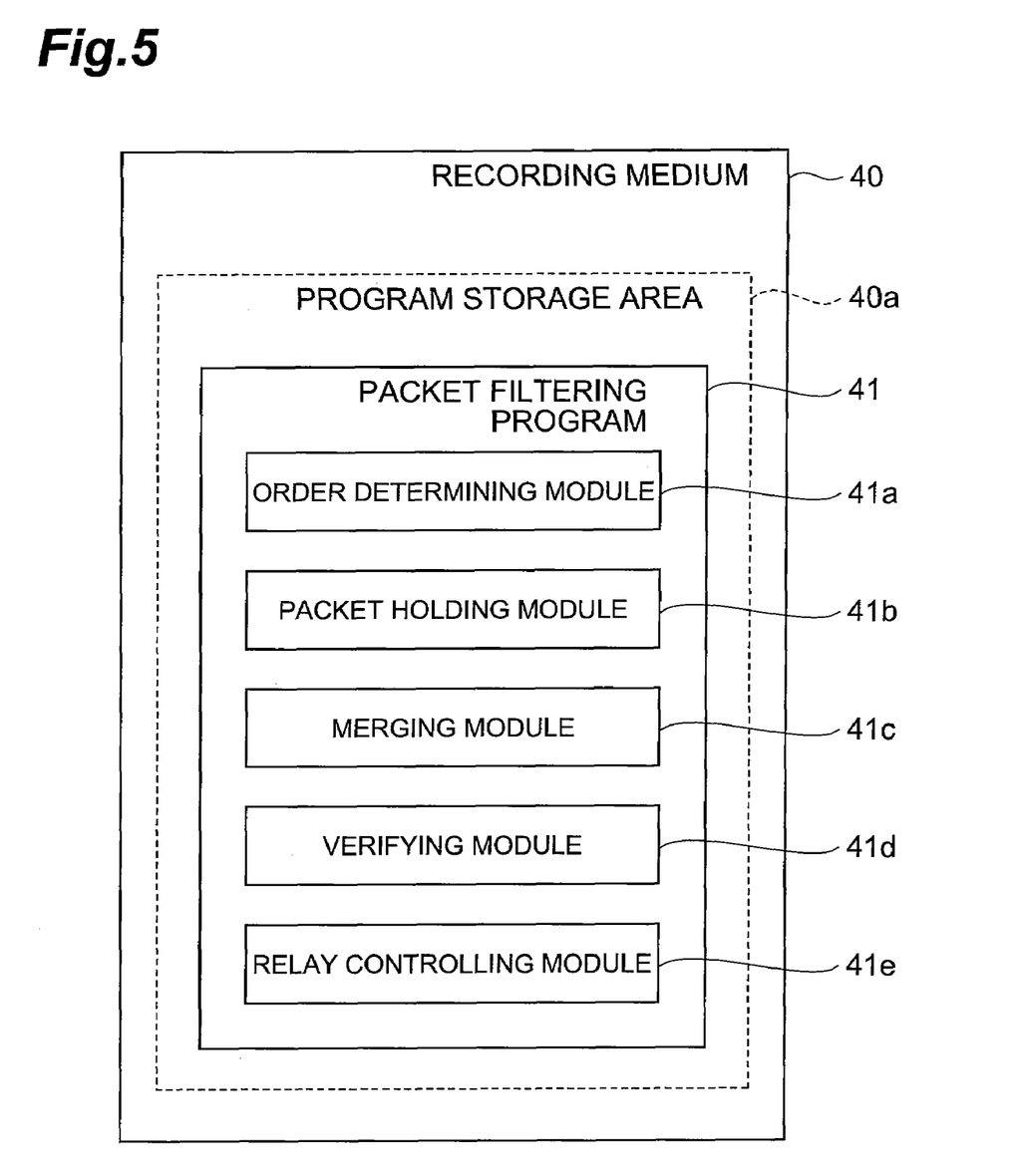
FIG. 5 is an illustration showing a configuration of a packet filtering program according to an embodiment.

The following will describe a packet filtering program for letting the relay device 10 execute the above-described sequential processing (packet filtering method). As shown in FIG. 5, the packet filtering program 41 is stored in a program storage area 40a formed in a recording medium 40 which the relay device 10 has.

The packet filtering program 41 is configured with an order determining module 41*a*, a packet holding module 41*b*, a merging module 41*c*, a verifying module 41*d*, and a relay controlling module 41*e*. A function implemented with execution of the order determining module 41*a* is much the same as the function of the order determiner 13 which the relay device 10 has. Similarly, the packet holding module 41*b* corresponds to the function of the packet holder 14, the merging module 41*c* to the function of the merger 15, the verifying module 41*d* to the function of the verifier 16, and the relay controlling module 41*e* to the function of the relay controller 17.

The packet filtering program 41 may be configured as follows: part or the whole thereof is transmitted through a transmission medium such as a communication line, received by another device, and recorded (including being installed) therein. The above program can also be distributed as recorded in a computer-readable recording medium. Examples of such recording media include magnetic media such as a hard disk and a flexible disk, optical media such as CD-ROM and DVD-ROM, magneto-optical media such as a floptical disk, or hardware devices such as RAM, ROM, and semiconductor nonvolatile memories, specially arranged so as to execute or store program commands. In another potential configuration, a drive for reading of recording media (e.g., a flexible disk drive or the like) arranged to read a program or the like from such recording media may be connected to the relay device 10.

INDUSTRIAL APPLICABILITY

The present invention can be utilized as the relay device, the packet filtering method, and the packet filtering program capable of detecting an irregular communication message in an application layer protocol, irrespective of types of protocols, while preventing an increase of the communication delay.

The invention claimed is:

1. A relay device for relaying a communication message on a packet-by-packet basis, comprising:
    order determining means for determining whether a packet received is one received in an order to be received;
    packet holding means for, when the order determining means determines that said packet is not one received in the order to be received, holding said packet, and for performing such a control as to relay said packet;
    merging means for determining whether said packet held by the packet holding means is one to be verified in conjunction with another packet received after said packet held by the packer holding means, based on the order to be received, and for merging a payload of said another packet with a payload of said packet held on the basis of the determination;
    verifying means for, when the order determining means determines that said packet is received in the order to be received, verifying whether the payload of said packet or a payload of merged packets merged by the merging means satisfies a predetermined rule, and for holding information about a verification content thereof in order to use the information in a next verification in the communication message; and
    relay controlling means for, when the verifying means verifies that said packet or merged packets satisfies the rule, performing such a control as to execute relay of said packet or merged packets and for, when the verifying means determines that said packet or merged packets does not satisfy the rule, performing such a control as to prohibit the relay of said packet or merged packets.

2. The relay device according to claim 1, wherein the verifying operation by the verifying means and the holding operation of the information about the verification content are carried out by means of an automaton.

3. A packet filtering method in a relay device for relaying a communication message on a packet-by-packet basis, the method comprising:
    an order determining step of determining whether a packet received is one received in an order to be received;
    a packet holding step of, when it is determined in the order determining step that said packet is not one received in the order to be received, holding said packet, and of performing such a control as to relay said packet;
    a merging step of determining whether the packet held in said packet holding step is one to be verified in conjunction with another packet received after said packet held, based on the order to be received, and of merging a payload of said another packet with a payload of said packet held on the basis of the determination;
    a verifying step of, when it is determined in the order determining step that the packet is received in the order to be received, verifying whether the payload of said packet or a payload of merged packets merged in the merging step satisfies a predetermined rule, and of holding information about a verification content thereof in order to use the information in a next verification in the communication message; and
    a relay controlling step of, when it is verified in the verifying step that said packet or merged packets satisfies the rule, performing such a control as to execute relay of said packet or merged packets and of, when it is determined in the verifying step that said packet or merged packets does not satisfy the rule, performing such a control as to prohibit the relay of said packet or merged packets.

4. The packet filtering method according to claim 3, wherein the verifying operation in the verifying step and the holding operation of the information about the verification content are carried out by means of an automaton.

* * * * *